Patented June 9, 1942

2,285,852

UNITED STATES PATENT OFFICE 2,285,852

WATER-SWELLING NONFIBROUS PELLICLE WITH A WATERPROOF COATING

Ralph T. K. Cornwell and Charles M. Rosser, Fredericksburg, Va., assignors to Sylvania Industrial Corporation, Fredericksburg, Va., a corporation of Virginia No Drawing. Application May 14, 1938, Serial No. 207,938

4 Claims. (Cl. 91—68)

The present invention relates to coated articles. More particularly it relates to coated articles capable of use for packaging, sealing or closure purposes.

A general object of the present invention is to provide a novel and useful coated article of the class described which may be rapidly and economically manufactured with a minimum of labor and machinery from materials which are commercially available.

A more specific object of the invention is to provide a coated article or material which is both waterproof and moistureproof.

Another object of the invention is to provide a waterproof coated article or material in which the waterproof coating will tenaciously adhere to the base even during immersion in water for an unlimited length of time.

A further object of the invention is to provide a waterproof and moistureproof coated cellulosic pellicle in which the waterproof and moistureproof coating is firmly and permanently anchored.

A still further object of the invention is to provide a coated pellicle formed of cellulosic material and in which the coating is capable of stretching to substantially the same extent as the pellicle when immersed in water.

Other objects of the invention will in part be obvious and will in part appear hereinafter.

According to the present invention, the coating composition which is applied as a lacquer for rendering pellicles of water-swelling material waterproof and moistureproof comprises a compatible mixture of urea-formaldehyde resin, a hardening agent for the resin, a plasticizer, and nitrocellulose, the several ingredients being dissolved in a suitable solvent in sufficient proportions that when the composition is applied to the pellicle and the solvent evaporated at an elevated temperature, there is produced a strongly adherent waterproof flexible coating. The waterproof pellicle is rendered moistureproof in accordance with the present invention by incorporating wax in the waterproof coating.

The invention accordingly comprises a composition of matter possessing the characteristics, properties and the relation of components which will be exemplified in the composition hereinafter described, and an article of manufacture possessing the features, properties, and the relation of elements which will be exemplified and hereinafter described, and the scope of the invention will be indicated in the claims.

By the term "waterproof" is meant the ability of the coating material to adhere to the base during immersion in water for an unlimited length of time.

By the term "moistureproof" is meant the ability of the coated material to resist the transmission or diffusion of moisture or water vapor therethrough to an extent at least 7 times as great as that displayed by the uncoated base when tested in accordance with accepted tests in the industry.

The wrapping of materials containing large amounts of moisture, and the closing and/or sealing of containers for liquids and liquid-containing solids has given rise to a need for transparent material which is both waterproof and moistureproof. It has been difficult heretofore to provide a waterproof material of a durable nature, since there has been a tendency on the part of previous materials to disintegrate when exposed to moisture over long periods of time due to a separation taking place between the base and the composition of matter used as a coating. This disadvantage, among others, has been overcome by the present invention.

The base of the article of the present invention may be formed of a pellicle having any desired shape such, for example, as a sheet, web, band, tube, cap, cup or other hollow body. The pellicle may be formed of a hydrophilic colloid, such as cellulose hydrate which, for example, may be regenerated from viscose, cuprammonium solutions of cellulose or de-esterified cellulose esters; from cellulose derivatives such as cellulose ethers or cellulose esters; or from gelatin, casein, and the like.

The waterproof, moistureproof coating of the present invention comprises nitrocellulose and urea-formaldehyde resin. The urea resin may be formed from di-methylol urea which may be made as described in U. S. Patent No. 1,989,628 issued January 29, 1935, to Metthias Schmibing, or a urea-formaldehyde condensation product which may be formed, for example, by reacting selected amounts of urea and formaldehyde in an aqueous solution at a slightly elevated temperature, for example, 30 to 35° C., until the solution gives a negative test for formaldehyde. Urea formaldehyde condensation products formed in other known ways may also be used if desired.

A plasticizer which is preferably a plasticizing resin is then added to the urea-formaldehyde resin. Any of the alkyd resins which are known to act as plasticizers will be suitable for this purpose.

A substance is then added to the resin composition to act as a hardener for the urea resin and to bring about further condensation of the urea resin when the solvents are removed. Among the hardening substances which are suitable are ammonium thiocyanate, p-toluenesulphonic acid and maleic acid.

A suitable solvent or a mixture of solvents is added to the urea resin so treated. Suitable solvents are mixtures of aromatic hydrocarbons, alcohols and esters, such as xylene and butanol, toluene and butyl acetate.

Nitrocellulose is added to the modified resin solution with suitable nitrocellulose solvents, such, for example, as mixtures of methyl cellosolve, xylene, and butanol.

The composition of the coating may contain the following ingredients expressed as parts by weight of one hundred parts:

| | |
|---|---|
| Nitrocellulose | 5–10. |
| Urea-formaldehyde resin | 60–85. |
| Plasticizer | 10–30. |
| Hardener | 7–13% of the total solids. |
| Solvents | Sufficient quantity to form solution containing 1 to 15% solids, depending upon the viscosity of the nitrocellulose. |

By way of explanation of the invention, but not in limitation thereof, the following example of the composition is given:

| | Percent |
|---|---|
| Nitrocellulose (5–6 sec.) | 9 |
| Urea-formaldehyde resin | 68 |
| Alkyd resin | 14 |
| Hardening substance | 9 |

The composition is applied in solution (1 to 15% of solids) to the pellicle and the coated pellicle is then subjected to an elevated temperature to evaporate the solvents and produce condensation of the urea resin to the insoluble stage. In addition to producing further condensation of the resins and evaporation of the solvent, the coating formed firmly anchors itself to the pellicle to the extent that it is not affected by water even when immersed for a long period of time. During heating, the temperature is maintained at 170 to 210° F. for approximately two minutes. At lower temperatures, the urea resin coating will undergo partial resinification so that the top or second coating may be applied. On standing for some time, the urea resin coating will automatically continue condensing to the insoluble stage.

The coating may have any degree of moistureproofness imparted thereto up to the point of becoming "moistureproof" within the definition previously given by adding 0.5 to 2% of paraffin without affecting materially the adherence of the coating to the base when immersed in water.

The single-coated waterproof pellicle so formed may be used in a number of ways, for example, for wrapping, sealing or forming container closures, or the composition coating may be applied over the surfaces of articles as a protective coating.

It will thus be seen that the present invention provides a composition of matter and a coated article which can be rapidly and economically produced and successfully utilized for purposes which could not be accommodated by the materials heretofore known.

The foregoing description has been given for the purpose of explanation and not limitation, since certain changes and modifications can be made in the described examples without departing from the scope of the invention.

What is claimed is:

1. An article of manufacture comprising a water-swelling nonfibrous pellicle, a single, waterproof coating disposed over and anchored to said pellicle and including nitrocellulose, a heat-hardened urea-formaldehyde resin and a plasticizer, the said coating being capable of stretching to substantially the same extent as the pellicle when immersed in water, and the urea-formaldehyde resin being present in a greater amount than the combined amount of the other ingredients of the coating.

2. An article of manufacture comprising a water-swelling nonfibrous pellicle, a single, waterproof, moistureproof coating disposed over and anchored to said pellicle and including nitrocellulose, a heat-hardened urea-formaldehyde resin, wax, and a plasticizer, the said coating being capable of stretching to substantially the same extent as the pellicle when immersed in water, and the urea-formaldehyde resin being present in a greater amount than the combined amount of the other ingredients of the coating.

3. An article of manufacture comprising a water-swelling nonfibrous pellicle having a single, waterproof coating disposed over and anchored to said pellicle and including, as parts by weight, a heat-hardened urea-formaldehyde resin from 60 to 85 parts, nitrocellulose from 5 to 10 parts and a plasticizer from 10 to 30 parts, the said coating being capable of stretching to substantially the same extent as the pellicle when immersed in water and also being flexible and nontacky.

4. An article of manufacture comprising a water-swelling nonfibrous pellicle having a single, waterproof, moistureproof coating disposed over and anchored to said pellicle and including, as parts by weight, a heat-hardened urea-formaldehyde resin from 60 to 85 parts, paraffin wax from 0.5 to 2 parts, nitrocellulose from 5 to 10 parts and a plasticizer from 10 to 30 parts, the said coating being capable of stretching to substantially the same extent as the pellicle when immersed in water and also being flexible and nontacky.

RALPH T. K. CORNWELL.
CHARLES M. ROSSER.